(12) United States Patent
Tolliver

(10) Patent No.: US 7,549,067 B2
(45) Date of Patent: Jun. 16, 2009

(54) POWER PRIORITIZATION IN POWER SOURCE EQUIPMENT

(75) Inventor: Eric Tolliver, Moorpark, CA (US)

(73) Assignee: Alcatel Lucent, Paris (FR)

( * ) Notice: Subject to any disclaimer, the term of this patent is extended or adjusted under 35 U.S.C. 154(b) by 530 days.

(21) Appl. No.: 11/020,396

(22) Filed: Dec. 21, 2004

(65) Prior Publication Data

US 2006/0133368 A1 Jun. 22, 2006

(51) Int. Cl.
*G06F 1/26* (2006.01)
(52) U.S. Cl. .................. 713/320; 713/310; 713/330; 713/340; 709/226; 370/389; 370/285
(58) Field of Classification Search ............ 361/90, 361/92; 713/300, 310–340; 709/223; 370/389, 370/285
See application file for complete search history.

(56) References Cited

U.S. PATENT DOCUMENTS

| | | | |
|---|---|---|---|
| 7,155,622 B2* | 12/2006 | Mancey et al. .............. 713/324 |
| 2003/0125886 A1 | 7/2003 | Spitaels et al. | |
| 2004/0073597 A1* | 4/2004 | Caveney et al. ............. 709/200 |
| 2004/0095917 A1 | 5/2004 | Lehr et al. | |
| 2004/0230846 A1 | 11/2004 | Mancey et al. | |
| 2006/0047800 A1* | 3/2006 | Caveney et al. ............. 709/223 |

OTHER PUBLICATIONS

Power Over Ethernet (PoE) Operation for the Series 5300xl Switches by hp.*

* cited by examiner

*Primary Examiner*—Ricky Ngo
*Assistant Examiner*—Kibrom T Hailu

(57) ABSTRACT

A system and method for automatically suspending power from an IEEE 802.3af Power Sourcing Equipment (PSE) switch to one or more Powered Devices (PDs) in accordance with user defined power allocation policies is disclosed. The PSE switch includes a classifier to associate each switch port with a power allocation policy and assign the applicable power priority level. The IEEE 802.3af PSE switch also includes a power manager to selectively allocate power between the PDs in accordance with those policies during a power outage, for example. If the switch is unable to provide power to each of the PDs, power to ports associated with a relatively low power priority is suspended before suspending power to higher priority ports. The policies may be automatically distributed to and implemented by multiple devices throughout a network without an administrator manually configuring the priorities base on knowledge of the specific types of end nodes coupled to the various ports or their priorities.

10 Claims, 3 Drawing Sheets

| POWER PRIORITY SCHEDULE 350 ||
| PORT NO. 410 | PRIORITY LEVEL 420 |
| 1 | MEDIUM |
| 2 | NOT APPLICABLE |
| 3 | LOW |
| 4 | HIGH |
| ... | ... |

POWER PRIORITIZATION IN POWER SOURCE EQUIPMENT

TECHNICAL FIELD

The invention relates to a data communications switch enabled to perform Power over Ethernet (PoE). In particular, the invention relates to a system for classifying inbound packets in accordance with user defined power allocation policies and selectively allocating power to the associated ports of the switch based on those classifications.

BACKGROUND

Power over Ethernet refers to a system for distributing power to Ethernet devices through standard Category 5/5e twisted-pair cables currently used to carry Ethernet data. The Ethernet device supplying the power is referred to as Power Sourcing Equipment (PSE) and the Ethernet device receiving the power is referred to as the Powered Device (PD). In accordance with the Institute of Electrical and Electronic Engineers (IEEE) standard reference 802.3af hereby incorporated by reference herein, the PSE first determines, or discovers, whether a connected device is a PoE compliant PD. If so, the PSE transmits direct current power to the PD at 48 volts with a maximum current of 350 milliamperes. As an optional extension to the discovery process, the PD may also specify the amount of power requirements from the PSE. PoE may be used to supply reliable power to low power Ethernet devices including voice over Internet Protocol (VoIP) telephones, wireless access points (WAP), and security cameras, for example.

The IEEE standard reference 802.3af defines types of PSEs including an endspan and midspan. An endspan PSE incorporates the power sourcing functionality within a network switch and the power transmitted via the data channels. That is, DC power is combined with the data signals transmitted on pin-pairs 3 and 6 and pin-pairs 1 and 2 of the Ethernet cable. A midspan PSE is a stand-alone device operatively coupled between the PD and a convention Ethernet switch, for example. The midspan PSE transmits power via unused cable pin-pairs 4 and 5 and pin-pairs 7 and 8. The PDs are generally adapted to receive power from either an endspan PSE or a midspan PSE.

When deployed in a network, a PSE switch may have a combination of PoE compliant PDs and various other non-compliant devices including desktop computers, servers, and printers, for example, which generally require more power than the PSE can provide. In normal operating conditions, the PSE can power each of the connected PDs. Where the public power grid goes down and power to the PSE switch lost, however, the power provided by the PSE to a plurality of PSs may be limited by the power supplied to the PSE switch by an uninterrupted power supply (UPS), for example. If the PSE switch cannot sustain the power requirements of all the PDs, the PSE switch may be forced to choose from among PDs those for which to continue power and those PDs to power down in accordance with a user defined configuration. Contemporary endspan PSE implementations require an operator to manually configure each port's power priority. As such, the operator need necessarily know in advance whether a port is to be coupled to a higher priority VoIP phone or a lower priority data device, for example. This configuration procedure is tedious and requires operator intervention whenever a PD is relocated and the port connection changed. There is therefore a need for a technique to automatically identify a port's power priority and conveniently change the power priority with minimal operator intervention as the devices move around in the network.

SUMMARY

The invention features a system and method for automatically suspending power from a PDE switching device to one or more PDs in accordance with user defined power allocation policies used to classify packet flows transmitted via ports of the switching device. In the preferred embodiment, the PSE switching device is adapted to provides power to a plurality of PDs in accordance with IEEE 802.3af. The PSE switch comprises a plurality of PoE ports, a classifier, and a power manager. The classifier inspects packets communicated through the ports and associates those ports with a power allocation policy that specifies a power priority level for the PD coupled to the port. The power manager selectively allocates power to each of the plurality of ports in accordance with its associated policy. In the preferred embodiment, the power allocation policies maintained by the PSE switching device associate one or more PDU properties, which define a packet flow, with one of a plurality of power priority levels. If the switching device is unable to provide power to each of the plurality of PDs, the power manager suspends power to ports associated with a relatively low power priority before suspending power to the higher priority ports.

In the preferred embodiment, the method of allocating power from the PSE switching device to a plurality of PDs comprises the steps of: receiving one or more packets from a plurality of PoE ports; associating a power priority level with each port based on the PDUs received on those ports; and selectively allocate power to each of the ports in accordance with those power priority levels. If necessary, power to ports having a relatively low power priority level is suspended before power to ports associated with a relatively high power priority level is suspended. The system and method presented herein enable a network administrator to automatically configure the power priorities of all ports of one or more switching devices based on the actual PDs connected to those ports with minimal user intervention.

BRIEF DESCRIPTION OF THE DRAWINGS

The present invention is illustrated by way of example and not limitation in the figures of the accompanying drawings, and in which.

DETAILED DESCRIPTION OF THE PREFERRED EMBODIMENT

Figures 1, 4:
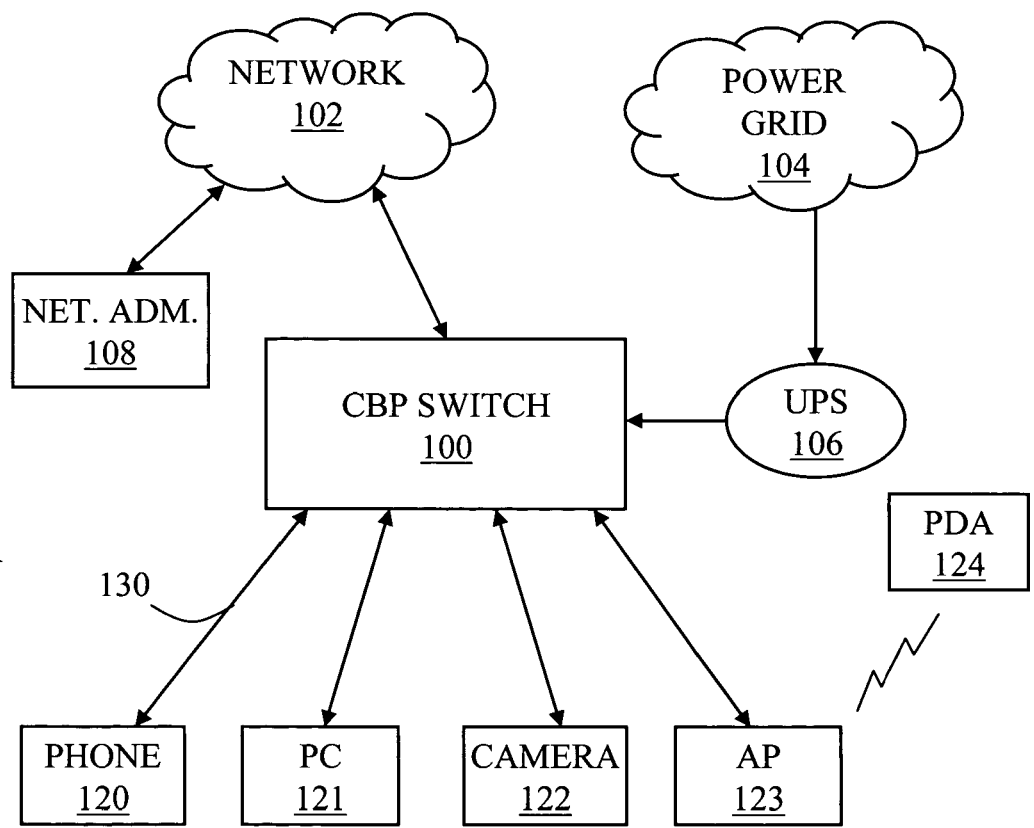
FIG. 1 is a functional block diagram of a data communications network topology including a classification-based PoE switching device, in accordance with the preferred embodiment of the present invention.
FIG. 4 is an exemplary table showing the port power priority assignments.

Illustrated in FIG. 1 is a data communications network topology including a plurality of network devices demonstrating the environment in which power prioritization may be implemented. The topology in the preferred embodiment includes a data communication network 102 and a public power grid 104. The data communication network 102 may include or be operatively coupled to a local area network (LAN), a wide area network (WAN), a metropolitan area network (MAN), an Internet Protocol (IP) network, the Internet, or a combination thereof, for example. The network 100 is operatively coupled to a switching device 100 for performing classification-based PoE (CBP), a plurality of clients 120-123, and a network administrator 108. The clients include or may be operatively coupled to a VoIP phone 120, a desktop personal computer (PC) 121, a security camera 122, and an wireless access point (AP) 123 through which a personal digital assistant (PDA) 124 or other mobile device may access the network 102. The power grid 104 or other power generator preferably provides 120 volt alternating current (AC) power, for example, to the switching device 100 via an Uninterruptable Power Supply (UPS) 106 designed to provide a limited amount of power to sustain the CBP switching device 100 if the power grid fails during, e.g., a black out or partial power outage.

Figure 2:
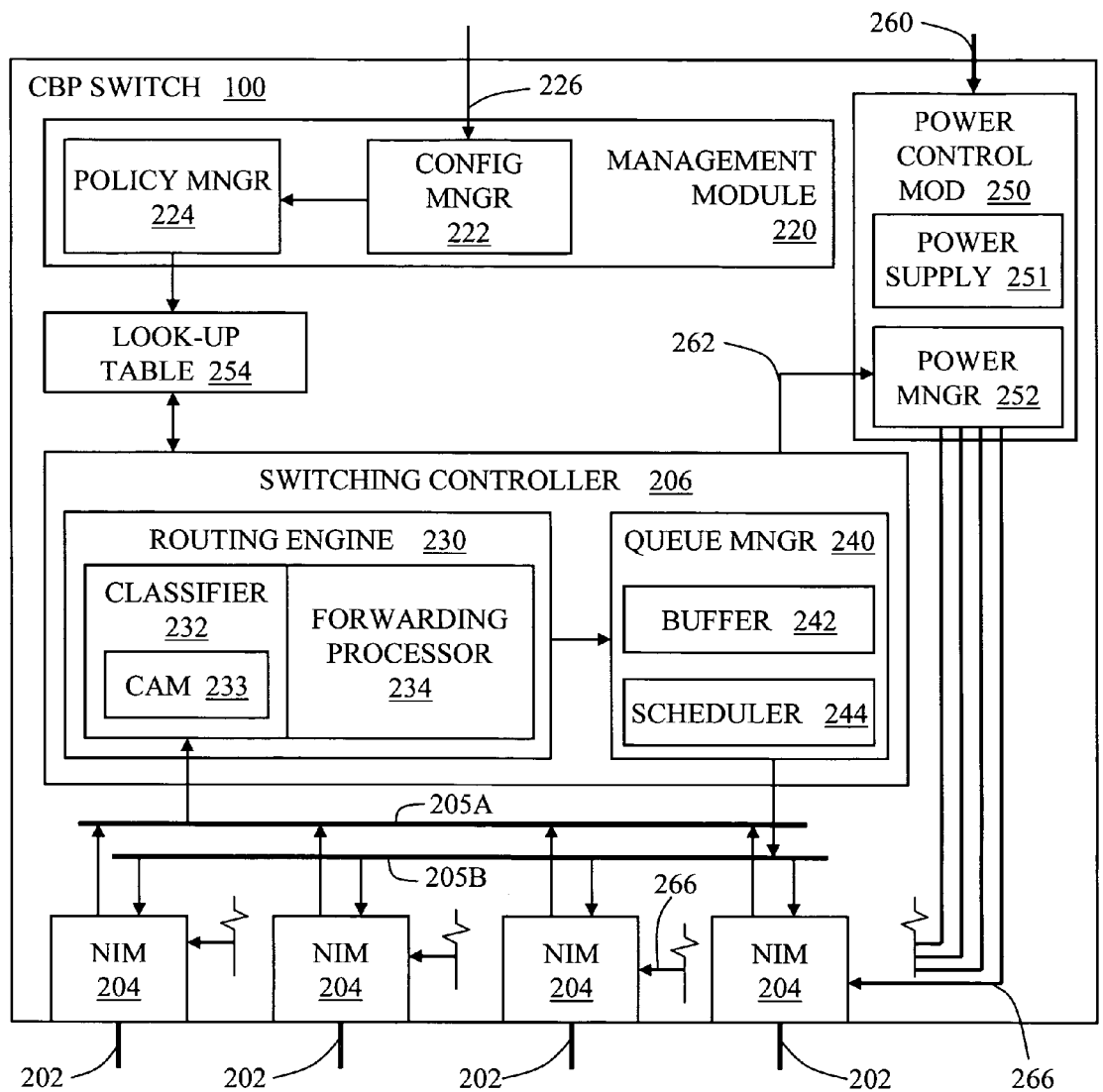
FIG. 2 is a functional block diagram of a classification-based PoE switching device, in accordance with the preferred embodiment of the present invention.

Illustrated in FIG. 2 is a functional block diagram of a multi-layer switch adapted to perform automated power prioritization in a CBP-enabled switch. The CBP switch 100 of the preferred embodiment comprises one or more network interface modules (NIMs) 204, one or more switching controllers 206, a management module 220, and a power control module 250, all of which cooperate to receive ingress and transmit egress data traffic via the external data/power ports 202 and to selectively transmit power to clients 120-123 during a power crisis, for example. For purposes of this embodiment, data flowing into the switch 100 from another network node is referred to herein as ingress data, which comprises ingress protocol data units (PDUs). In contrast, data propagating internally to an external port 202 for transmission to another network node is referred to as egress data, which comprises egress PDUs. Each of the plurality of the external ports 202 is a duplex port adapted to receive ingress data and transmit egress data.

The NIMs 204 preferably include one or more physical layer interfaces and media access control (MAC) interfaces adapted to exchange PDUs, e.g., Ethernet frames, via network communications links 130. The ingress PDUs are conveyed from the plurality of NIMs 204 to the switching controller 206 by means of one or more ingress data buses 205A. Similarly, the egress PDUs are transmitted from the switching controller 206 to the plurality of NIMs 204 via one or more egress data buses 205B. The NIMs 204 are also adapted to transmit power 266 received from a power control module 250 to connected PDs in accordance with IEEE 802.3af.

The management module 220 generally comprises a policy manager 224 for retaining and implementing traffic policies dictating where and how ingress PDUs are to be processed and forwarded. The policies implemented by the policy manager 224 are preferably based in part on Open Systems Interconnect (OSI) reference model Layer 2-Layer 7 PDU properties derived from source learning operations, route information received from other routing devices, and filtering rules uploaded by the network administrator via a configuration manager 222 using, for example, simple network management protocol (SNMP) messages 226. The traffic policies derived from source learning, other network nodes, and the administrator are made available to the routing engine 230 and collectively represented by the forwarding or look-up table 254.

In addition to the traffic policies, the policy manager 224 also retains PoE power allocation polices specifying classes of PDs and the power priority level associated with each of those classes. As described in more detail below, the classes are generally defined in terms of PDU properties including packet protocol and addressing information, for example. The associated power priority is a hierarchical ranking determining the preference with which the associated port is allocated power in a power crises. Each of the plurality of ports 202 may qualifying under one or more of these classes based on the properties of the PDUs received on, and in some cases transmitted to, the port. The management module 220 uploads the PoE power allocation polices to the high speed look-up table 254 where they are made available to the switching controller 206 during ingress packet classification operations.

In some embodiments, the PoE power allocation polices are simultaneously distributed to a plurality CBP switches from the administrator 108 in the form of one or more scripts, e.g., Perl scripts. The Perl scripts with the policies are forwarded to one or more routers throughout the network 102 which then distribute the Perl scripts to those CBP switches who identify any of the routers as its default router. Upon receipt of the Perl script, the CBP switches automatically extract the PoE power allocation polices and update their respective policy managers 224.

The switch 100 preferably comprises at least one switching controller 206 capable of, but not limited to, Layer 2 (Data Link) and Layer 3 (Network) switching operations as defined in the Open Systems Interconnect (OSI) reference model. The set of possible Layer 2 protocols for operably coupling the external ports 202 to a wired and/or wireless communications link include the Institute of Electrical and Electronics Engineers (IEEE) 802.3 and IEEE 802.11 standards, while the set of possible Layer 3 protocols includes Internet Protocol (IP) version 4 defined in Internet Engineering Task Force (IETF) Request for Comment (RFC) 791 and IP version 6 defined in IETF RFC 1883.

The switching controller 206 preferably comprises a routing engine 230 and a queue manager 240. The routing engine 230 comprises a classifier 232 that receives ingress PDUs from the data bus 205A, inspects one or more fields of the PDUs, classifies the PDUs into one of a plurality of flows using a content addressable memory 233, and retrieves forwarding information from the forwarding table 254 retained in high-speed memory. The forwarding information retrieved from the forwarding table 254 preferably includes, but is not limited to, a flow identifier used to specify those forwarding operations necessary to prepare the particular PDU for egress, for example. In accordance with the present invention, the classifier 232 is also adapted to associated one or more of the ports 202 with at least one of the PoE power allocation polices and assign the applicable power priority to the port from which the PDU was received. The switching controller 206 downloads the power priority level assignments to the power controller module 250.

The forwarding processor 234 receives the ingress PDUs with the associated forwarding information and executes one or more forwarding operations prior to transmission to the appropriate egress port or ports. The forwarding operations preferably include but are not limited to header transformation for re-encapsulating data, VLAN tag pushing for appending one or more VLAN tags to a PDU, VLAN tag popping for removing one or more VLAN tags from a PDU, quality of service (QoS) for reserving network resources, billing and accounting for monitoring customer traffic, Multi-Protocol Label Switching (MPLS) management, authentication for selectively filtering PDUs, access control, higher-layer learning including Address Resolution Protocol (ARP) control, port mirroring for reproducing and redirecting PDUs for traffic analysis, source learning, class of service (CoS) for determining the relative priority with which PDUs are allocated switch resources, and color marking used for policing and traffic shaping, for example.

After the forwarding processor 234, the PDUs are passed to and stored in the queue manager 240 until bandwidth is available to transmit the PDUs to the appropriate egress port. In particular, the egress PDUs are buffered in one or more of a plurality of priority queues in the buffer 242 until they are transmitted by the scheduler 244 to the external port 202 via the output data bus 205B.

The power control module 250 includes a power supply 251 and a power manager 252. The power supply 251 includes the electrical circuitry to convert the 120 volt AC power via the UPS 106 to 48 volt DC power provided to the PDs. The power manager 252 selectively distributes the DC power from the power supply 251 to the one or more PDs among clients 120-123 via the plurality of power conductors 266 and NIMs 204. The CBP switching device 100—being an endspan PSE—injects the data signals on pin-pairs 3 and 6 and pin-pairs 1 and 2 of the Ethernet cables 107 with the DC power at NIMs 204. A power control module 250 capable of being adapted to some embodiments of the invention is available from PowerDsine, Inc., which has offices in Farmingdale, N.Y.

Figure 3:
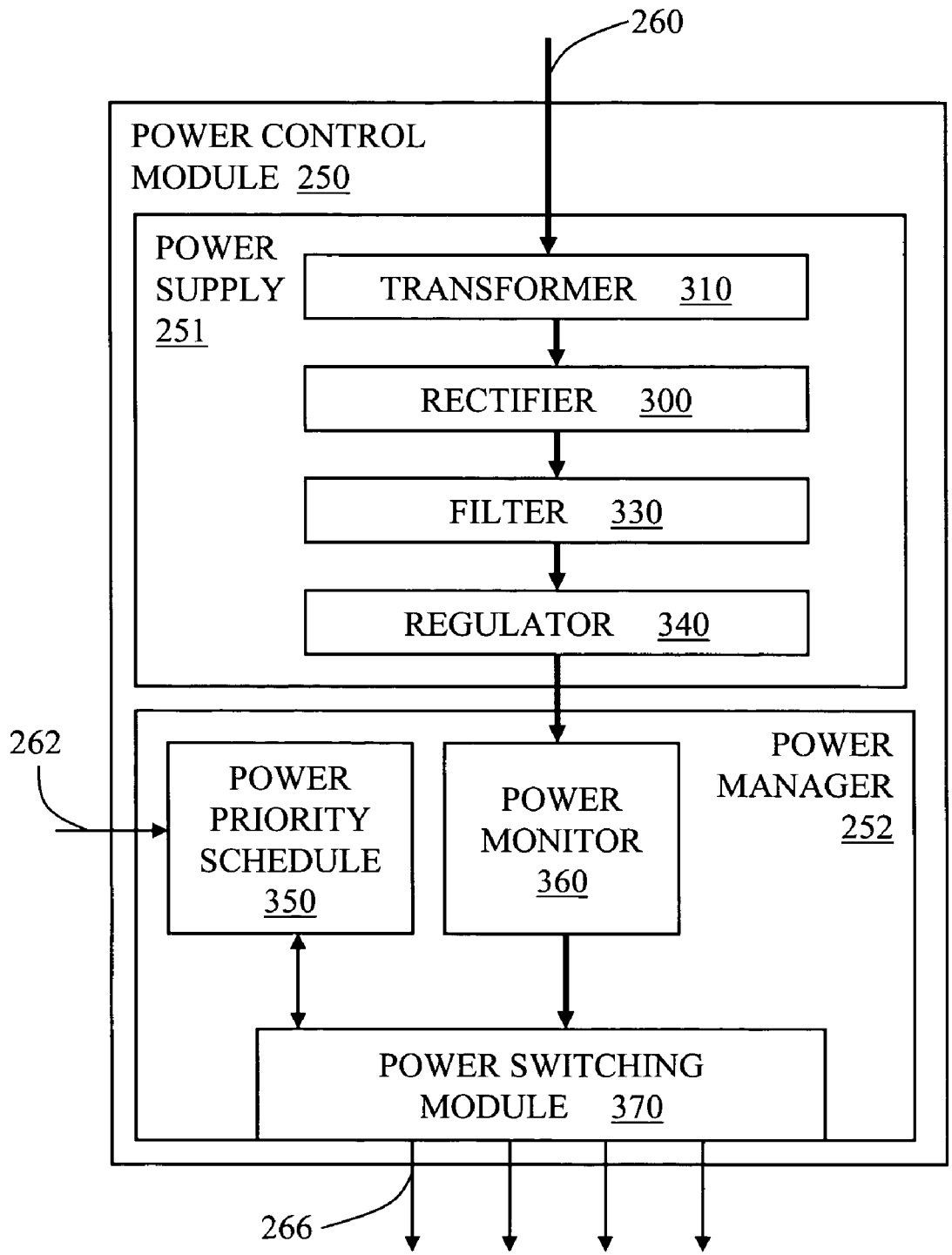
FIG. 3 is a functional block of an exemplary power control module, in accordance with the preferred embodiment of the present invention.

Illustrated in FIG. 3 is an exemplary power control module 250 for implementing the power priority in the PSE switch. The power supply 251 preferably includes power conditioning circuitry for generating the PoE DC power. The power conditioning circuitry in the preferred embodiment includes a transformer 310 to step down the input line 260 voltage to a predetermined level, a rectifier 300 to convert the AC input signal to a pulsating DC voltage, a filter 330 to convert the pulsating DC voltage to a substantially uniform DC signal, and a regulator 340 to maintain the output of the power supply 260 at a relatively constant level in the presence of changes in load current or fluctuation in the input line 260 signal.

The power manager 252 in the preferred embodiment is adapted to intelligently select which ports of the plurality of ports 202 that are to be allotted power—when the received UPS power is insufficient to satisfied the PDs—based on the ports' power priority level 262. The power manager 252 includes a power priority schedule 350, a power monitor 360, and a power switching module 370. The power priority schedule 350 including a list of the power priorities 262 which, as described above, are assigned by the classifier 232 by associating the PDU properties with the a power allocation policy.

The power manager 252 also receives the DC power signal from the regulator 340 which is monitored by the power monitor 360. Neglecting the power consumed by the switching device 100 itself, the power monitor 360 compares the received power level with the load drawn by the PDs. Although the received power is usually sufficient, the UPS 106 may be insufficient to power the PDs during a partial or full power outage of the power grid 104. In the absence of a power outage, the regulator 340 output is distributed to the PDs present among the one or more clients—including in the example the VoIP phone 120, the security camera 122, and the access point 123—via the power switching module 370. If, however, a power outage should occur and it necessary to suspend power to one or more PDs, the power manager 252 consults the power priority schedule 350 to determine which ports to disable and in what order. Ports are disabled by the switching module 370 based on their relative power priority.

Illustrated in FIG. 4 is an exemplary power priority schedule 350. The schedule 350 includes a listing of each port 202 and the power priority level 420 associated with the port. In the preferred embodiment, there are three priority levels associated with the PDs although a plurality of priority levels may be employed depending on the implementation. The ports associated with non-PD in the context of IEEE 802.3af are not provided power and therefore do not have an associated priority level. The first port corresponding to the VoIP phone 120 is assigned a medium level priority in accordance with the power allocation rules to provide the user an opportunity to call out in the case of an emergency, for example. Port three associated with the security camera 122, which assigned the low priority level, would be the first port to be suspended in a power outage. Port four associated with the wireless access point 123, which services a safety manager PDA 124 in this example, is assigned the highest priority and would be disabled only after all other ports were disabled. One skilled in the art will appreciate that multiple ports may be assigned the same priority level, in which case an arbitration scheme may be employed to dictate the order in which the power to those ports is terminated.

As discussed above, the power priority level of the ports 202 are determined by the classifier 232 based on power allocation policies. In particular, the power allocation policies associate one or more PDU properties—i.e., a packet flow to or from a PD—with a particular priority level. The rule may specify, for example, that all ports operably coupled to a VoIP phone are assigned a medium priority level to insure that power will be maintained during a partial power outage, while the port through which the safety manager's PDA 124 is reachable is assigned the highest priority to ensure that the safety office is accessible during both a partial outage and a full local power outage. Similarly, power allocation policies may also be designed to automatically drop a port based on one or more user defined criteria. A rule may specify, for example, that the power to a port be terminated during a power crisis if the classifier 232 observes a hypertext transfer protocol (HTTP) request being initiated. In general, the power allocation policies may be made to depend on any number of PDU properties including source MAC address, destination MAC address, source IP address, destination IP address, protocol type including, e.g., IP and IPX, IPv4 as opposed to IPv6, virtual local area network (VLAN) tag properties including, e.g., 802.1Q tags and 802.1p priority, quality of service (QoS) designators, class of service (CoS) designators, port number, traffic levels, i.e. the number of packets transmitted in the preceding second, for example, and type of IP address, i.e., whether the packet possesses a dynamic address in accordance with the Dynamic Host Configuration Protocol (DHCP) or a fixed IP address, for example. In some embodiments, the assigned power priority level may also be made to depend on authentication status, that is, a port may be assigned a relatively low priority until after the client has been authenticated and is officially on the network.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

I claim:

1. A power sourcing equipment (PSE) configured for being operatively coupled to a plurality of powered devices (PDs), the PSE comprising:
   a plurality of power over ethernet (PoE) ports, wherein each of the ports is configured for receiving one or more protocol data units (PDUs);

a classifier configured for associating at least one of a plurality of power allocation policies with each port of the plurality of ports based on the one or more PDUs received on the respective ports and for assigning a respective power priority level derived from the associated at least one power allocation policy thereto; and a power manager configured for selectively allocating power to each of the plurality of ports in accordance with the associated at least one power allocation policy, wherein selectively allocating power to each of the plurality of ports in accordance with the associated at least one power allocation policy includes receiving the respective power priority level from the classifier and selectively allocating power to each of the plurality of ports at least partially dependent upon the respective power priority level, wherein selectively allocating power includes suspending power delivery, and wherein each one of said power priority levels corresponds to a respective level of importance of functionality provided through an associated one of ports such that suspending power delivery to a particular one of said ports is performed dependent upon the respective level of importance of functionality provided therethrough and independent of a particular level of power being drawn thereby.

2. The PSE in claim 1, wherein the PSE is selected from the group consisting of: router, switch, multi-layer switch, and bridge.

3. The PSE in claim 1, wherein each of the plurality of power allocation policies comprises one or more PDU properties and an associated power priority level.

4. The PSE in claim 3, wherein each one or more power priority level is selected from a set of a two or more hierarchical power priority levels.

5. The PSE in claim 1, wherein the one or more PDU properties comprise a media control access (MAC) address.

6. The PSE in claim 1, wherein the one or more PDU properties comprise a PDU protocol type.

7. The PSE in claim 1, wherein the power manager is configured for monitoring a power load drawn by each of the PDs and wherein said suspending of power is performed when an amount of power drawn by said PDs is greater than a level of power available from an active power supply from which said PDs draw power.

8. The PSE in claim 1, wherein the plurality of power allocation policies are distributed to one or more default routers, and to a plurality of data communication switches associated with the one or more default routers.

9. A method of allocating power to a plurality of powered devices (PDs) with a power sourcing equipment (PSE) switching device, the method comprising the steps of:

receiving one or more protocol data units (PDUs) from a plurality of power over ethernet (PoE) ports;

associating at least one of a plurality of power allocation policies with each port of the plurality of ports based on the one or more PDUs received on the respective ports;

deriving a respective power priority level in accordance with the at least one power allocation policy associated with each port;

assigning the respective power priority level with a corresponding one of the ports; and allocating power to each of the plurality of ports in accordance with the respective power priority level thereof, wherein allocating power includes suspending power delivery, and wherein each one of said power priority levels corresponds to a respective level of importance of functionality provided through an associated one of ports such that suspending power delivery to a particular one of said ports is performed dependent upon the respective level of importance of functionality provided therethrough and independent of a particular level of power being drawn thereby.

10. The method of allocating power in claim 9, and further comprising the step of automatically suspending power to one or more of the plurality of ports associated with a low power priority level before suspending power, to a port associated with a high power priority level.

* * * * *